Dec. 19, 1950          E. L. MOYER          2,534,791

TEMPERATURE COMPENSATED CONTROL ROD

Filed Oct. 14, 1948

*INVENTOR.*
EDWARD L. MOYER

BY *Richard W. Treverton*

*ATTORNEY.*

UNITED STATES PATENT OFFICE 2,534,791

TEMPERATURE COMPENSATED CONTROL ROD

Edward L. Moyer, Reynoldsburg, Ohio, assignor to Curtiss-Wright Corporation, a corporation of Delaware Application October 14, 1948, Serial No. 54,438

6 Claims. (Cl. 74—579)

This invention relates to a temperature compensated rod suitable for transmission of control forces or movements, such as in an aircraft control system, and for similar purposes.

In cases where a control rod is subjected to great variations in temperature, as for example in push-pull control rods extending through the engine compartments of ram jet powered aircraft, the resulting variation in length of the rod may be sufficient to seriously interfere with control of the aircraft, especially in cases where automatic or remote control is employed instead of control by a human occupant-pilot.

The primary objectives of the invention reside in the provision of a rod suitable to transmit or support substantial loads which will at the same time be strong, light in weight, and remain substantially constant in length throughout a wide range of temperatures.

According to the invention the foregoing objectives are met by making up the rod of three telescoping tubes which are composed of materials having at least two different coefficients of thermal expansion, the tubes being so connected at their ends that the expansion of the one thereof having the greater expansion with temperature increase acts to contract the rod assembly and thereby compensate for the expansion of the other two rods which act to extend the assembly.

The foregoing and other objects and advantages will become apparent from the following description of the typical embodiment of the invention shown in the accompanying drawings, wherein.

Figure 1:
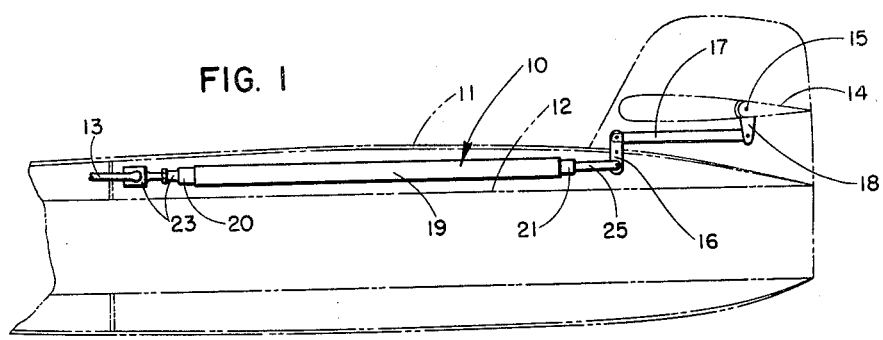
Figure 1 is a side elevational view of the temperature compensated rod arranged as a push-pull rod in an aircraft elevator control system.
Figure 2:
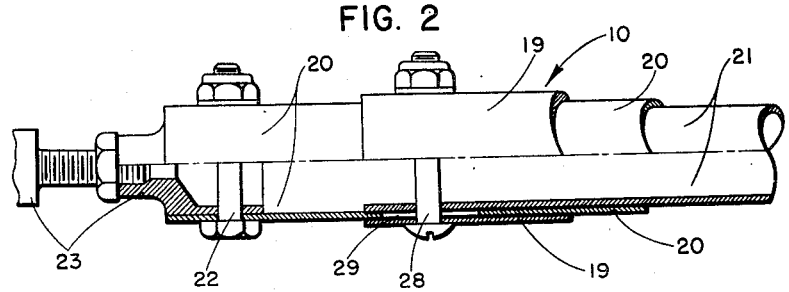
Figure 2 is an enlarged view of one end of the rod, half in side elevation and half in longitudinal section.
Figure 3:
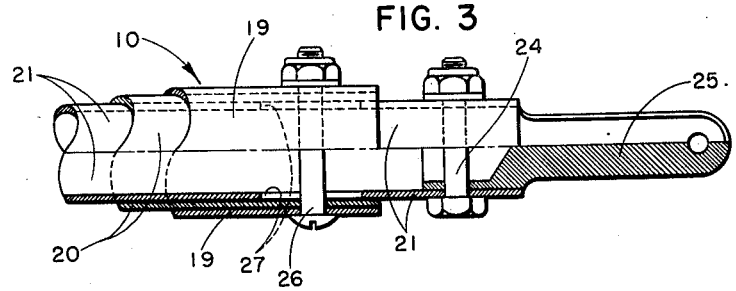
Figure 3 is a view similar to Figure 2 but showing the opposite end of the rod; and, Figure 4 is a fragmentary bottom elevation of a portion of the structure shown in Figure 3.
Figure 4:
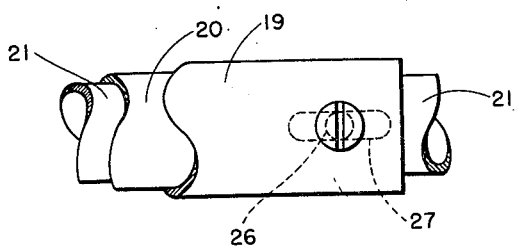

In Figure 1 the temperature compensated control rod 10 is shown as extending within an engine compartment of an aircraft, between the fuselage shell 11 of the latter and a ram jet engine 12. One end of the rod is attached to a part 13 of the control system that is actuated by a suitable means (not shown) to shift the rod axially for the purpose of operating elevator 14 about its hinge axis 15. To achieve this purpose the aft end of the rod 10 is pivotally connected to a lever 16 which in turn is pivoted to the fuselage shell and also to a link 17 that extends to the elevator horn 18.

The rod 10 comprises three telescoped tubes designated 19, 20 and 21 of which one, in this instance tube 20, is joined by a fastener 22 to fittings 23 which are connected to element 13, and of which another one, tube 21, is attached by a fastener 24 to a fitting 25 that in turn is pivoted to lever 16.

Adjacent the right end of the rod a headed fastener 26 extends diametrically through the three tubes, securing the right ends of tubes 19 and 20 against relative axial displacement. However the fastener 26 extends through elongated apertures 27 in tube 21 and hence the right end of latter may shift axially relative to tubes 19 and 20.

Similarly adjacent the left end of the rod 10 a headed fastener 28 extends diametrically through the three tubes. In this instance the fastener secures the left ends of tubes 19 and 21 together, but by reason of elongated slots 29 in tube 20 (corresponding to slots 27 in tube 21) the left end of tube 20 may move relatively to fastener 28 and to the left ends of tubes 19 and 21.

The tubes are of such diameters that they may have relatively free sliding movement upon one another, and the tubes that are secured to the end fittings 23 and 25, in this case the tubes 20 and 21, are formed of a material or materials having a substantially lesser coefficient of thermal expansion than the material of which the other tube, 19, is formed. The materials and the lengths of the tubes should be selected so that the change in length with temperature of the two tubes that are connected to the end fittings substantially equals the change in length of the other tube, thereby maintaining the length of the composite rod substantially constant. Preferably the tubes 20 and 21 are formed of steel and tube 19 of aluminum (including aluminum alloys) since these substances are of satisfactory strength and the temperature coefficient of expansion of steel is somewhat less than half that of aluminum. This enables tubes 20 and 21 to be extended somewhat beyond the effective ends (at fasteners 26 and 28) of tube 19, to provide for connection of the rod to adjacent parts of the control system. For, as will be apparent from the foregoing, the combined length between fasteners 26 and 28 of tubes 20 and 21 (which when expanding act to lengthen the rod 10 assembly) is exactly twice that of tube 19 (which when expanded acts to shorten the rod assembly) and unless the coefficients of expansion of the two materials chosen is somewhat smaller than one to two such extensions and accurate temperature compensation cannot both be provided. It will be understood however that various combinations of materials other than steel and aluminum may have suitable temperature coefficients of expansion and may be used in place of them.

The composite rod is simple to construct, and is strong and light in weight. It will be seen that while the three tubes act in series so far as tension and direct compression loads are concerned, they act in multiple in resistance to bending or buckling loads which may be incidental to or may accompany compression loads.

It will also be understood that the embodiment shown and specifically described herein, while constituting the preferred form of the invention for the particular purpose indicated, is set forth by way of illustration of the inventive principle involved and not by way of limitation, there being no intention to limit the scope of the invention otherwise than as required by the appended claims.

I claim as my invention:

1. In an aircraft control system having a push-pull rod passing through a zone subjected to substantial temperature variation, said rod comprising three telescoped tubes, one pair of said three tubes being secured together adjacent one end thereof and another pair of said three tubes being secured together adjacent the opposite end thereof by fasteners which extend substantially diametrically through the tubes, the ends of the tubes not so secured by said fasteners having elongated openings passing said fasteners, said ends of the tubes not so secured being axially slidable relative to the secured tube ends and being connected to the control system, the two tubes which have their ends so connected to the control system being of steel and the other tube being of aluminum, whereby said last mentioned two tubes have a temperature coefficient of expansion approximately half that of the material of the other tube and whereby the length of the rod is therefore substantially unaffected by the temperature changes which it will encounter in said zone.

2. In an aircraft control system having a push-pull rod passing through a zone subjected to substantial temperature variation, said rod comprising three telescoped tubes, one pair of said three tubes being secured together adjacent one end thereof and another pair of said three tubes being secured together adjacent the opposite end thereof by fasteners which extend substantially diametrically through the tubes, the ends of the tubes not so secured by said fasteners having elongated openings passing said fasteners, said ends of the tubes not so secured being axially slidable relative to the secured tube ends and being connected to the control system, the two tubes which have their ends so connected to the control system being of material having a temperature coefficient of expansion substantially less than that of the material of the other tube, whereby the length of the rod is substantially unaffected by the temperature changes which it will encounter in said zone.

3. In an aircraft control system having a push-pull rod passing through a zone subjected to substantial temperature variation, said rod comprising three telescoped tubes, one pair of said three tubes being secured together adjacent one end thereof and another pair of said three tubes being secured together adjacent the opposite end thereof, the ends of the tubes not so secured being axially slidable relative to the secured tube ends and being connected to the control system, the two tubes which have their ends so connected to the control system being the inner tubes and being formed of material having a temperature coefficient of expansion substantially less than that of the material of the outer tube.

4. A temperature compensated push-pull rod comprising three telescoped tubes, one pair of said three tubes being secured together adjacent one end thereof and another pair of said three tubes being secured together adjacent the opposite end thereof by fasteners which extend substantially diametrically through the tubes, the ends of the tubes not so secured by said fasteners having elongated openings passing said fasteners, said ends of the tubes not so secured being axially slidable relative to the secured tube ends and being adapted for connection to means for applying loads to the rod, the two tubes which have their ends so adapted being the inner tubes and being formed of steel and the outer tube being of aluminum whereby the temperature coefficient of expansion of the last mentioned tube is substantially more than that of the material of the other two tubes and whereby the length of the rod is substantially unaffected by the temperature changes.

5. A temperature compensated push-pull rod comprising three telescoped tubes, one pair of said three tubes being secured together adjacent one end thereof and another pair of said three tubes being secured together adjacent the opposite end thereof by fasteners which extend substantially diametrically through the tubes, the ends of the tubes not so secured by said fasteners having elongated openings passing said fasteners, said ends of the tubes not so secured being axially slidable relative to the secured tube ends and being adapted for connection to means for applying loads to the rod, the two tubes which have their ends so adapted being the inner tubes and being formed of material having a temperature coefficient of expansion substantially less than that of the material of the outer tube, whereby the length of the rod is substantially unaffected by the temperature changes.

6. A temperature compensated push-pull rod comprising three telescoped tubes, one pair of said three tubes being secured together adjacent one end thereof and another pair of said three tubes being secured together adjacent the opposite end thereof, the ends of the tubes not so secured being axially slidable relative to the secured tube ends and being adapted for connection to means for applying loads to the rod, the two tubes which have their ends so adapted being the inner tubes and being formed of material having a temperature coefficient of expansion substantially less than that of the material of the outer tube.

EDWARD L. MOYER.

REFERENCES CITED

The following references are of record in the file of this patent:

UNITED STATES PATENTS

| Number | Name | Date |
| --- | --- | --- |
| 279,828 | Shive | June 19, 1883 |

FOREIGN PATENTS

| Number | Country | Date |
| --- | --- | --- |
| 325,561 | France | Oct. 23, 1902 |
| 71,861 | Austria | Nov. 15, 1915 |